F. H. VICK.
DISPENSING DEVICE FOR RECEPTACLES.
APPLICATION FILED JAN. 16, 1915.
1,259,057.
Patented Mar. 12, 1918.
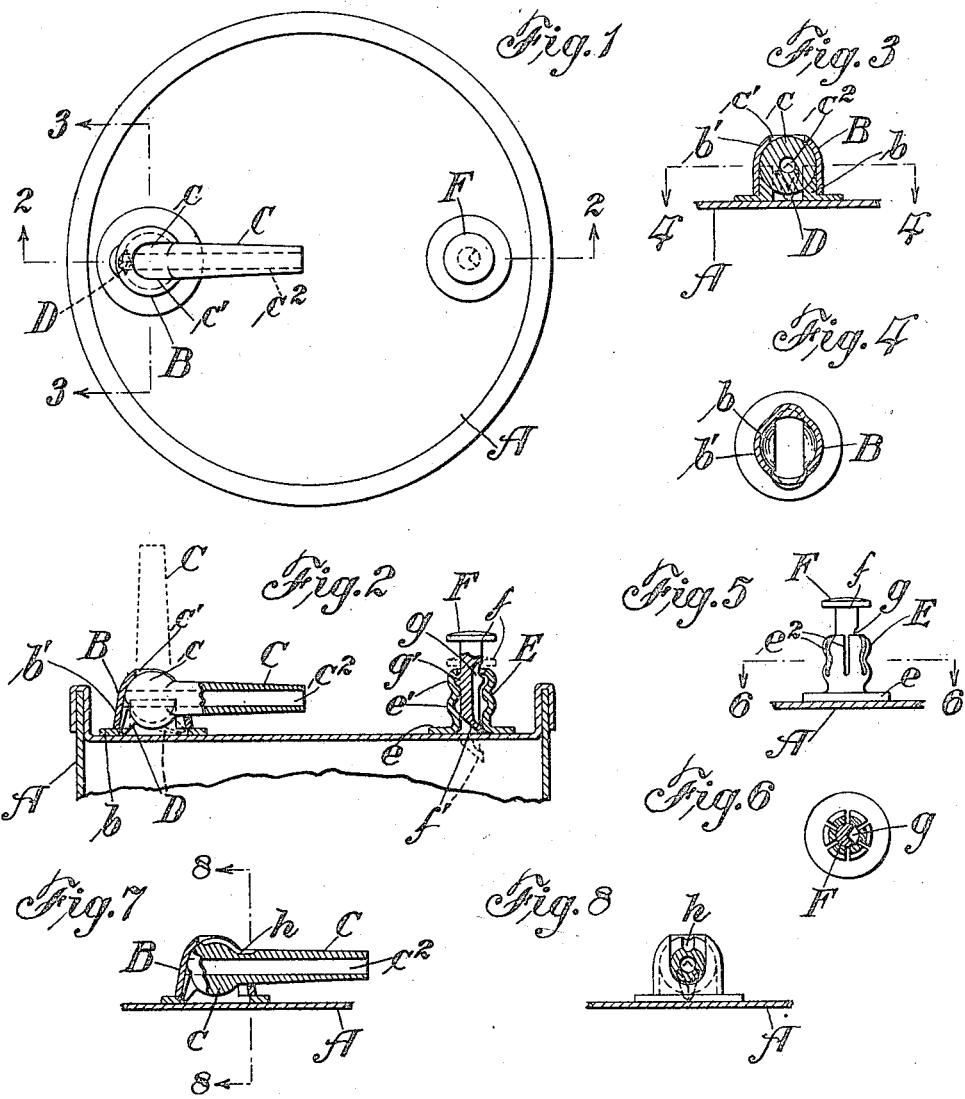

UNITED STATES PATENT OFFICE.

FRANK H. VICK, OF NEW YORK, N. Y.

DISPENSING DEVICE FOR RECEPTACLES.

1,259,057.      Specification of Letters Patent.      Patented Mar. 12, 1918.

Application filed January 16, 1915. Serial No. 2,644.

*To all whom it may concern:*

Be it known that I, FRANK H. VICK, a citizen of the United States, residing in the city of New York, borough of Manhattan, county and State of New York, have invented a certain new and useful Dispensing Device for Receptacles, of which the following is a specification.

This invention relates to receptacles or containers for liquid or semi-liquid substances, and it is particularly aimed to produce convenient means whereby the material may be initially, hermetically sealed in the receptacle or container, to be subsequently released, at the desired time, to withdraw the whole or a portion of said material. If it is desired to withdraw only a portion at any one time, the present invention embodies means whereby the receptacle may be substantially sealed after the initial, partial drawing off of the material, and the receptacle is adapted to be unsealed again, from time to time, at subsequent operations of pouring off the contents of the container, without, however, leaving the interior of said container in communication with the exterior atmosphere intermediate said draw-off periods.

It has been proposed heretofore to provide receptacles with spouts, nozzles, and the like, which are positioned opposite apertures in the receptacle, so that, by manipulating the draw-off devices, communication can be opened, at will, between the apertures in the container and the pouring spout. When these well-known devices are employed, however, the contents of the receptacle, if it be a sticky or liquid substance, generally corrodes or gums the working parts of the draw-off mechanism, so that it is difficult to operate the same, especially upon the initial opening and withdrawal from the receptacle. This is due to the fact that the contents of the receptacle is allowed, at all times, to contact with the draw-off devices.

With the foregoing in mind, the present invention provides means whereby the material is entirely contained within the unbroken and unobstructed walls of the container, and on the exterior of said container is positioned the draw-off mechanism, so that the material within the container does not come into contact with said mechanism. However, when it is desired to pour the material from the receptacle, the mechanism may be operated to disrupt or puncture the wall of the receptacle and permit of the passage of fluid from the interior thereof.

Speaking generally, the invention embodies a spout arranged for pivotal movement on the exterior of a container and with said spout is associated suitable disrupting or puncturing means whereby the moving of the spout in a predetermined manner serves to actuate the disrupting means to cut away a portion of the wall of the receptacle immediately adjacent the outlet passage of the spout. Means is also provided to allow of the inlet of air into the receptacle to take the place of the material drawn therefrom, and this means may be incorporated in the spout or may be separate therefrom. In either case, after the receptacle has been initially opened, the spout mechanism and air inlet devices are operable to close communication between the interior of the receptacle and the exterior thereof.

Features of the invention, other than those specified, will be apparent from the following specification read in conjunction with the accompanying drawings.

The accompanying drawings illustrate two embodiments of my invention, which embodiments are illustrative only and do not define the limits of the invention.

Figure 1 is a plan view of a container embodying the present invention.

Fig. 2 is a central, vertical section therethrough, taken on line 2—2 of Fig. 1.

Fig. 3 is a fragmental section taken on line 3—3 of Fig. 1.

Fig. 4 is a section through the outlet spout, said section being taken on line 4—4 of Fig. 3 and certain parts being omitted, in the interest of clearness.

Fig. 5 is a fragmental elevation of certain air inlet means which I preferably employ.

Fig. 6 is a section through said air inlet means, said section being in the plane of the line 6—6 of Fig. 5.

Fig. 7 is a fragmental section through a modified form of my invention, said section being substantially in the plane of line 2—2 of Fig. 1, through said modified receptacle, and Fig. 8 is a section taken on line 8—8 of Fig. 7.

Referring to the drawings, and particularly Figs. 1 to 6, inclusive, A designates a receptacle or container which, so far as the present invention is concerned, may be of paper, sheet metal, or other desired material. On the top of the container is positioned a valve casing B, adapted to contain a ball or knob $c$, which forms the base of a spout or nozzle C. Valve casing B may be of any desired convenient form, but, for convenience in manufacture, it is preferably built up from a tubular plug $b$, over which fits a shell $b'$. The upper face of plug $b$ is concaved to form a seat for ball $c$, and shell $b'$ is formed to conform generally to ball $c$ at its upper portion and fit down snugly over plug $b$. Ball $c$ is thus substantially inclosed in suitable bearings within valve casing B. Shell $b'$ is provided with a slot $c'$, circumferentially thereof, through which nozzle C protrudes, and said slot is of sufficient length and so disposed as to allow the spout to assume a position substantially parallel with the top of the receptacle or to be shifted to a position in angular relation thereto. Valve casing B is adapted to be secured to the top of the receptacle by any desired means, such as soldering, riveting, or the like, so as to be fixed in rigid position to said receptacle, and the receptacle is so formed that the wall of said receptacle is continuous and that no apertures or holes are provided in juxtaposition with the valve casing. Thus, when the receptacle has been filled and the cover applied, said receptacle may be sealed air-tight, and the material contained therein will, in no way whatever, come into contact with the draw-off devices hereinbefore described.

It is essential that means be provided to allow of the withdrawal of the material from the receptacle at the desired time, and, according to the particular embodiment of the invention shown, this means is embodied in a knife or cutter D, formed integral with ball $c$. In the closed position of the valve, spout C is shown in Fig. 2 as folded down into parallel relation with the top of the receptacle, and cutter D is so positioned on the ball that it is out of operative relation with the top of the receptacle. However, if spout C is swung from its closed position, shown in full lines in Fig. 2, to the position illustrated in dotted lines therein, it will be manifest that the cutter will travel in the arc of a circle from its full line position to its dotted line position, and, in so moving, will pass through the top of the receptacle and cut a slot therein, thereby disrupting the same and affording communication between the interior of the receptacle and the interior of valve casing B. Spout C is provided with a longitudinal passage $c^2$, which extends from one end of said spout through the opposite side of ball $c$. Thus, when the spout is in the dotted line position described, the material within the receptacle is free to flow, when the receptacle is tilted, through the valve casing and passage $c^2$, to the exterior of the receptacle. After the receptacle has been initially opened as described, it will be manifest that the folding down of the spout into its closed position will rotate ball $c$ sufficiently to bring the inner end of passage $c^2$ into abutting relation with shell $b'$, thereby cutting off communication between the interior and exterior of the casing.

It is well known that, in pouring some materials, it is difficult to withdraw the same from a closed container without providing means adapted to allow of the entrance of air into said container during the pouring of the material therein contained. According to the present invention, this means may be associated with the pouring mechanism or may be separate therefrom. In the preferred form of the invention, I make the same independent of the pouring mechanism; i. e., I position the air inlet means at such a point in the receptacle that, when said receptacle is tilted to allow the material to flow from the spout, the point of inlet of air referred to comes above the surface of the liquid contained in the receptacle. The form of air inlet means referred to embodies a thimble E provided with a flange $e$, by means of which it is adapted to be secured by any well known means to the wall of the receptacle. Thimble E is preferably corrugated circumferentially, as at $e'$, and is also longitudinally slotted, as at $e^2$, whereby said thimble is formed into a plurality of resilient arms. The upper end of thimble E is open and a plunger F normally projects longitudinally through said thimble. The upper end of plunger F is provided with a push button $f$, and its lower end is provided with a sharpened point $f'$. In attaching the air inlet means to the receptacle, the same is accomplished without puncturing or, in any way, disrupting the receptacle, so that, until it is desired to withdraw the material therefrom, the wall of the receptacle adjacent said means is left intact. However, when it is desired to withdraw said material and to allow the inlet of air into the receptacle, pressure is brought to bear upon push button $f$ of plunger F, with the result that the sharpened point $f'$ is forced through the wall of the receptacle.

Air is allowed to pass from the exterior of the receptacle thereinto through a duct or channel $g$, extending longitudinally of plunger F, said air being adapted to enter passage $g$ through slots $e^2$ in thimble E, and thereafter flow through said passage and into the interior of the receptacle, as clearly shown in dotted lines in Fig. 2. When the pouring operation is finished, the plug may be lifted to its initial position, and its lower end forms a closure to preclude the admission of air to the receptacle at this point. It is preferable that suitable means be provided to retain the plunger in either its open or closed position, as desired, and this means is illustrated as embodying an enlargement $g'$ on the plunger, which engages with the annular corrugations $e'$ heretofore described and maintains the plunger in either of its positions. The resiliency of the thimble, occasioned by the slots $e^2$, allows of the passage of the enlarged portion $g'$ from one corrugation to another.

It is manifest, from the foregoing description, that material may be hermetically sealed and preserved, in this manner, in storage for a long period, without the least chance of air leaking into the receptacle, as is common in the devices now generally employed. Moreover, should the dispensing device be formed from metals which are subject to chemical action by the material contained in the receptacle, it is manifest that such materials cannot act upon said metals until the receptacle is disrupted by the consumer. The device of the present invention is, therefore, highly sanitary and hygienic, and enables perishable materials to be properly preserved, while, at the same time, providing means for facilitating the withdrawal of such materials from their inclosing containers.

Throughout the foregoing description, the preferred embodiment of the invention has been considered, but, as I do not restrict myself to the specific features of construction therein illustrated, I have shown a further embodiment of the invention in Figs. 7 and 8 of the drawings. In the construction therein shown, the draw-off means and air inlet means are part of the same mechanism and are simultaneously operable. The spout C, with its coöperating ball valve $c$, the draw-off passage $c^2$, and the valve casing B may be constructed in substantially the same manner as that hereinbefore described in connection with the embodiment of the invention shown in Figs. 1 to 6, the difference between the two structures being, mainly, that, in the modified form, ball $c$ is provided with a circumferential channel $h$, which extends along a portion of the spout C. This channel is so positioned and is of such length that, when the spout is manipulated to open position, one end of the channel $h$ is in communication with the exterior of the receptacle, whereas the other end of the channel is in communication with the interior of the receptacle. Thus, as the material is poured through the passage $c^2$ of the spout, air may enter said receptacle through passage $h$. This form of draw-off valve dispenses with the independent air inlet means hereinbefore described, and is thus more simple in construction and more economical to manufacture. Moreover, in dispensing certain materials, it operates with considerable efficiency. It will, of course, be understood that the operation of the spout, i. e., the manipulation of the same to open or closed position, is the same as hereinbefore described.

I have shown, in both embodiments of the invention described, the dispensing device positioned on the top of the receptacle, but it will be understood that this showing is not controlling, since such devices may be positioned anywhere upon the wall of said receptacle. Moreover, while I have described a particular form of valve, I wish it understood that I may employ other types of valve if desired, the controlling factor being that the initial operation of the valve disrupt or pierce the receptacle. I do, therefore, not restrict myself to the specific embodiments illustrated and described, but consider my invention as broadly novel as is commensurate with the appended claims.

Having thus fully described the invention, what I claim as new, and desire to secure by Letters Patent, is:—

1. In dispensing means of the class described, a normally sealed receptacle, a rotary valve mounted on the exterior thereof and adapted to be rotated from closed to open position and vice versa, and means associated with said valve for piercing said receptacle adjacent said valve, when the valve is rotated to its open position, to allow the material contained within the receptacle to be withdrawn through the valve, said valve being subsequently rotatable to a closed position, in which position the break in the receptacle is sealed.

2. In dispensing means of the class described, a normally closed container, a valve casing positioned on the exterior thereof, a rotary valve positioned within said valve casing and adapted to be pivotally shifted from closed to open position and vice versa, said valve being provided with an outlet passage, and a cutter mounted on said rotary valve whereby, when the valve is rotated into open position, the cutter is caused to pierce the wall of the receptacle to allow of the withdrawal of the material therein contained, and, when subsequently rotated into closed position, serves to seal the break in the receptacle, in combination with an air inlet duct leading through the valve for allowing of the passage of air into the container when the valve is open and the material is flowing from said container through the outlet passage.

3. In dispensing means of the class described, a normally closed container, a valve casing positioned on the exterior thereof, a rotary valve positioned within said valve casing and adapted to be pivotally shifted from closed to open position and vice versa, said valve being provided with an outlet passage, and a cutter mounted on said rotary valve whereby, when the valve is rotated into open position, the cutter is caused to pierce the wall of the receptacle to allow of the withdrawal of the material therein contained, and, when subsequently rotated into closed position, serves to seal the break in the receptacle.

In testimony whereof I have signed my name to this specification in the presence of two subscribing witnesses.

FRANK H. VICK.

Witnesses:
  HENRY WOOG,
  BLAINE WELCH.

Copies of this patent may be obtained for five cents each, by addressing the "Commissioner of Patents, Washington, D. C."